Patented May 24, 1932

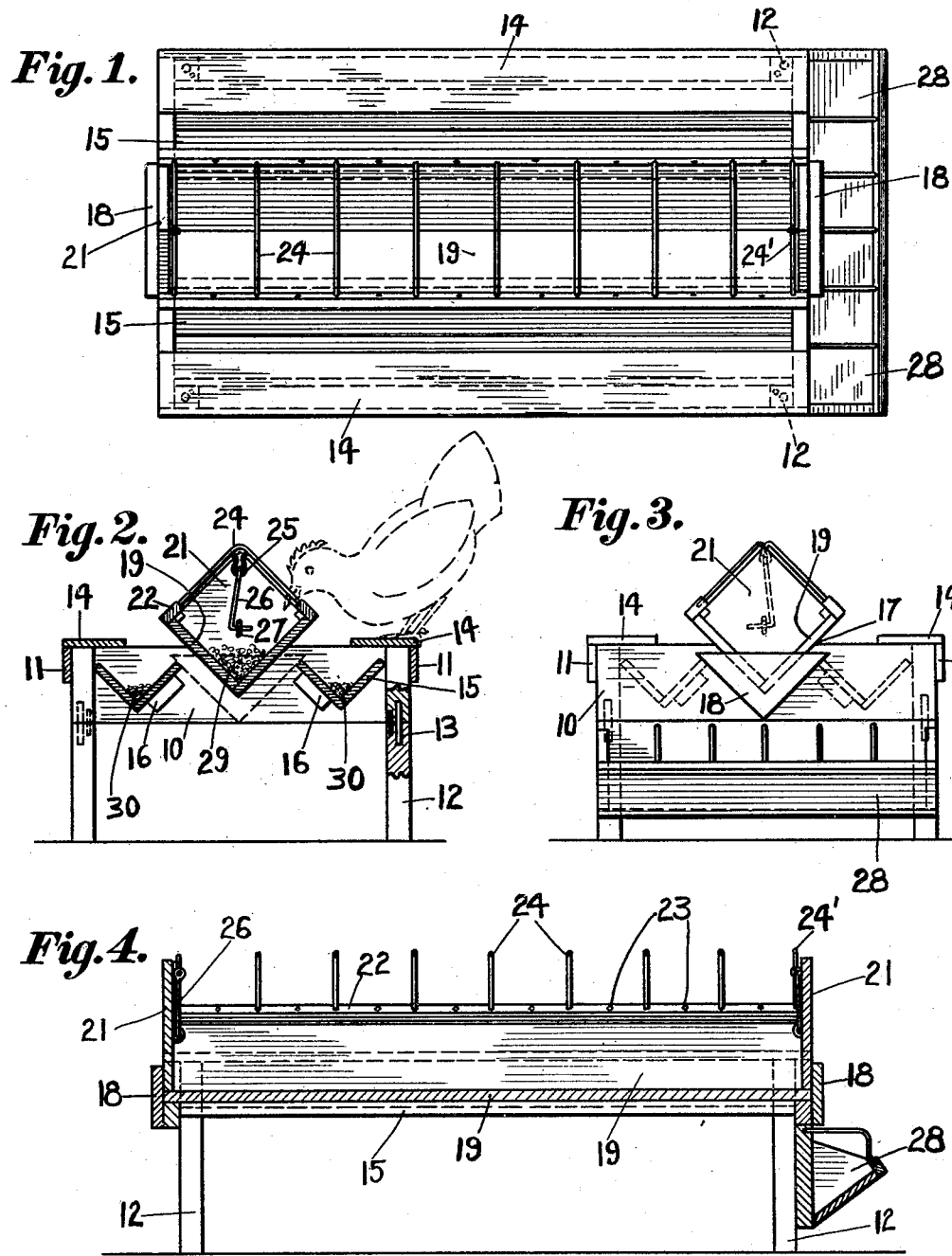

1,859,582

UNITED STATES PATENT OFFICE

DAVID L. CRABTREE, OF MILLARD, NEBRASKA

POULTRY FEEDING DEVICE

Application filed January 15, 1930. Serial No. 420,900.

The present invention relates to improvements in poultry feeders and has for an object to provide an improved poultry feeder, in which only such quantities of feed as is necessary for the birds will be partaken of.

Another object of the invention is to provide an improved poultry feeder so constructed and relatively arranged as to its several parts to avoid the birds scattering and wasting the feed and so disposed and constructed as to accommodate all sizes of birds, for instance both chickens and chicks.

A further object of the invention is to provide, in conjunction with a poultry feeder, a guard for the feeding troughs, which is both removable and interchangeable for cleaning purposes and for accommodation of various sizes of poultry.

A still further object of the invention is to provide an improved poultry feeder, the construction of which is such that, in use, the birds are forced to wipe their bills upon certain parts of the structure thereby removing, from their bills, feed clinging to the outside thereof.

Another object of the invention is to provide a construction which may be readily assembled when shipped in knocked down compact shape and which can be manufactured economically of conventional sizes of stock lumber.

A primary object of the invention is to provide an improved poultry feeder for use in connection with chickens and the like, in which the feed will be maintained in a sanitary and clean condition at all times by protecting it against contamination by the birds.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of a poultry feeder constructed in accordance with the present invention.

Figure 2 is a transverse sectional view of the feeder.

Figure 3 is an end view; and

Figure 4 is a longitudinal vertical sectional view.

Referring more particularly to the drawings, 10 designates the end walls and 11 the side walls which together form a frame of rectangular elongated shape. Legs 12 are secured to the frame by means of nails. Each leg, as best shown in Figure 2, is of two piece construction, the pieces being separably jointed together, preferably by means of dowel pins 13. When the device is used for feeding chicks the lower portion, inclusive of the dowel pins 13, are removed thereby lowering the device closely adjacent to the ground for the accommodation of the small birds which are penned apart from the chickens for brooding purposes.

Horizontally disposed platform-perches 14 are secured to the upper edges of the members 10 and 11, in a manner whereby an open space is provided between the perches as best shown in Figures 2 and 3.

Elongated V-shaped drip pans 15 are removably positioned underneath the perches. The pans 15 are formed of wood and supported upon blocks 16 secured to the end members 10 of the frame and also further supported by resting against the legs 12, as best shown in Figure 2.

The end members 10 of the frame are incised whereby V-shaped notches or cut-away portions 17 are provided. The V-shaped blocks 18 cut from the end walls 10 are secured to the outside of said end walls as shown in Figure 4, thereby providing detents for preventing longitudinal movements of the feeding trough now to be described.

The feeding trough 19, in use, is V-shaped, as shown in Figure 2, and consists of bottom members 20 which are received in the notches 17 of the members 10. The trough is provided with end members 21, which are square in plan. Bill wiping rails 22 are adapted to rest upon the upper edges of the bottom members 20 of the feed trough 19.

The rails 22 are provided with a plurality of recesses 23 which are regularly spaced apart and adapted to receive the ends of the trough guards 24. The latter are preferably formed of wire bent to an inverted V-shape.

In feeding chickens the wire guards 24 are spaced apart as shown in Figure 4, each alternate recess 23 being employed. In feeding chicks all of the recesses 24 are utilized, extra guards 24 being inserted in the recesses, thereby providing smaller openings between the guards and thus preventing the small birds from entering within the interior of the trough 19.

The two end wire guards 24' are formed with loops 25, as shown in Figure 2, and hooks 26 are attached to the loops by means of the eyes of the hooks. Staples 27 are provided for receiving the hooks 26, said staples being secured to the end members 21 of the feeding trough. By this means the rails 22 and the wire guards 24 are removably secured to the feeding trough 19.

An auxiliary trough 28 is preferably attached to the end of the device thereby providing a container for crushed and ground oyster shell or the like comminuted substances which are wholesome to the chickens for the purpose of hardening the shells of their eggs and to assist the formation thereof.

It will be noted that in the practice of the invention that a chicken in order to remove the feed 29 from the trough 19 is forced to stand upon a perch 14 in that position shown by dotted lines in Figure 2. As thus positioned it is impossible for the feed 29 to become contaminated by droopings from the birds. It is well-known that in feeding, chickens move their bills toward their breasts after dipping their beaks into the feed and prior to raising their heads in an upright position for facilitating the swallowing of the feed and this fact is taken advantage of by so shaping and arranging the parts of the device that the chickens wipe their bills upon the upper edges of the rails 22 in withdrawing their heads from the trough, with the result that excess feed is removed from the outside of the chicken's bills, said feed falling back into the trough 19.

If the feed 29 be in a mass, such as wet bran, the chickens, before swallowing, often shake their heads and as heretofore practiced the excess feed upon the outside of their beaks becomes wasted. Said shaking movement is in longitudinal alignment of the device for birds perched as shown in Figure 2. By means of the arrangement and location of the drip pans 15 the excess feed from the bills of the chickens will be received in the pans 15 in instances where the chickens shake their heads, said pans also receiving such excessive feed as may drip from the rails 22. The feed indicated at 30 which has been lodged in the drip pans as above described may be replaced into the main container 19 and in this manner a great saving of feed is accomplished. In actual practice it has been noted that chickens will not feed from the drip pans at times when the trough 19 contains feed, said pans being too low and positioned where the birds cannot reach the trapped feed therein conventionally.

It will be noted that the drip pans 15 and feeding troughs 19 are easily removable and detachable for cleaning purposes.

It is commonly known, as heretofore practiced, chickens waste more feed by spilling it on the ground than is consumed as used food.

The present invention provides means whereby the desideratum of conserving feed may be accomplished and also provides an advantageous arrangement of parts whereby the birds cannot perch upon the feeding device but in a position whereby contamination of the feed is prevented.

It may be noted that the wire guards 24 are so shaped that when installed in a position of use that a sharp peak is provided upon which the birds cannot perch.

I do not wish to be restricted to the size, form and proportion of the various parts, and obviously changes could be made in the construction herein described without departing from the spirit of the invention, it being only necessary that such changes fall within the scope of the appended claims:

What is claimed is:—

1. In a poultry feeder, a frame, perches carried by the frame, a detachable feed trough carried by the frame and spaced from said perches, detachable drip pans carried by the frame, said drip pans being disposed below and between the trough and perches and in vertical alinement with the space to prevent loss of feed, and bill wiping rails attached to the upper edges of the trough and having a plurality of recesses therein.

2. In a poultry feeder, a frame, perches carried by the frame, a detachable feed trough carried by the frame, detachable drip pans carried by the frame, said drip pans located to each side and below the feed trough, bill wiping rails attached to the upper edges of the trough and having a plurality of recesses therein, and V-shaped wire guards adapted for insertion into said recesses.

In testimony whereof, I have affixed my signature.

DAVID L. CRABTREE.